US007325712B2

(12) United States Patent
Schiestl

(10) Patent No.: US 7,325,712 B2
(45) Date of Patent: Feb. 5, 2008

(54) ELECTRICAL DRIVE-IN TOOL HAVING TWO COMPONENT FLYWHEEL

(75) Inventor: Ulrich Schiestl, Feldkirch (AT)

(73) Assignee: Hilti Aktiengesellschaft, Schaan (LI)

( * ) Notice: Subject to any disclaimer, the term of this patent is extended or adjusted under 35 U.S.C. 154(b) by 15 days.

(21) Appl. No.: 11/368,137

(22) Filed: Mar. 2, 2006

(65) Prior Publication Data

US 2006/0261125 A1 Nov. 23, 2006

(30) Foreign Application Priority Data

May 23, 2005 (DE) ..................... 10 2005 023 683

(51) Int. Cl.
*F16F 15/30* (2006.01)
*F16F 15/22* (2006.01)

(52) U.S. Cl. .................. 227/133; 29/894; 29/894.011; 29/894.32; 74/572

(58) Field of Classification Search ................. 29/894, 29/894.32, 894.011; 74/572.11, 572.2; 227/133
See application file for complete search history.

(56) References Cited

U.S. PATENT DOCUMENTS 4,036,080 A * 7/1977 Friedericy et al. ....... 74/572.11
4,182,138 A * 1/1980 McGuire ..................... 464/92
4,186,623 A * 2/1980 Friedericy et al. ....... 74/572.11
4,285,251 A * 8/1981 Swartout ................. 74/572.12
4,341,001 A * 7/1982 Swartout ..................... 29/894
4,765,198 A * 8/1988 Stravrinidis .............. 74/572.11
4,860,611 A * 8/1989 Flanagan et al. ........ 74/572.12
4,928,868 A 5/1990 Kerrigan
5,057,071 A * 10/1991 Piramoon .................... 494/16
5,268,608 A * 12/1993 Bitterly et al. ................ 310/90
5,319,844 A * 6/1994 Huang et al. ................. 29/598
5,692,414 A * 12/1997 Gregoire .................. 74/572.12
6,014,911 A * 1/2000 Swett ...................... 74/572.12
6,211,589 B1 * 4/2001 Ahlstrom et al. ............. 310/74
6,817,266 B1 * 11/2004 Brackett .................. 74/572.11

FOREIGN PATENT DOCUMENTS

JP 59093547 A * 5/1984

* cited by examiner

*Primary Examiner*—Brian D. Nash
(74) *Attorney, Agent, or Firm*—Abelman, Frayne & Schwab

(57) ABSTRACT

An electrical drive-in tool includes a driving ram (13) displaceable in a guide (12), and a motor-driven drive flywheel (32) for driving the driving ram (13) and having a first component forming at least a circumferentially arranged rim and formed of a metal selected from a group consisting of steel and alloyed iron, and a second component formed of a material having a density greater than a density of the metal the first component is formed of.

6 Claims, 3 Drawing Sheets

ELECTRICAL DRIVE-IN TOOL HAVING TWO COMPONENT FLYWHEEL

BACKGROUND OF THE INVENTION

1. Field of the Invention

The present invention relates to an electrical drive-in tool for driving in fastening elements and including a driving ram displaceable in a guide, and a drive unit including a drive flywheel having a first component forming at least a circumferentially arranged rim, and a second component, and a motor for rotating the flywheel. The present invention also relates to a drive flywheel for an electrical drive-in tool.

2. Description of the Prior Art

In electrical drive-in tools of the type described above, the driving ram is accelerated by the flywheel that is driven by a motor. In drive-in tools, the drive-in energy, which is supplied by an accumulator, amounts maximum to about 35-40 j. In drive-in tools, which were developed on the basis of a flywheel principle, the energy which is stored in the flywheel, must be transferred to the driving shaft by a coupling.

A drive-in tool of the type described above is disclosed in U.S. Pat. No. 4,928,868. In the drive-in tool of U.S. Pat. No. 4,928,868, the driving ram is displaced between a motor-driven flywheel and an idler wheel. In order to frictionally couple the driving ram with the flywheel, the driving ram is displaced toward the flywheel by an adjusting mechanism, is pressed against the circumferential surface of the flywheel, and is accelerated. The flywheel is formed of two components. The first component forms the circumferentially arranged rim to which the driving ram is coupled. The rim is formed of steel in order to take into consideration high frictional forces. The second component includes a hub and is formed of a lighter material than steel.

A drawback of the drive-in tool according to U.S. Pat. No. 4,928,868 consists in that the increase of the drive-in energy can be achieved only by increase of the rotational speed of the flywheel or by increase of the flywheel size. The drawback of an increased rotational speed consists in that the coupling of the driving ram to the flywheel becomes more difficult, and slippage and resulting wear increases. If the volume of the flywheel increases, the entire drive-in tool becomes more bulky and is difficult to handle.

Accordingly, an object of the present invention is a drive-in tool of the type discussed above in which a high drive-in energy can be obtained in a technically simple way, and the above-mentioned drawbacks of the known drive-in tool are eliminated.

SUMMARY OF THE INVENTION

This and other objects of the present invention, which will become apparent hereinafter, are achieved by providing a flywheel in which the first component is formed of metal selected from a group consisting of steel and alloyed iron, and the second component is formed of a material having a greater density than the metal the first component is formed of. This permits to increase the kinetic energy stored in the flywheel in a simple way, without increasing the constructional space or the necessary rotational speed of the flywheel. The rim of the flywheel, which is connectable with the driving ram, is still formed of steel or alloyed iron, so that the rim wear remains minimal.

Advantageously, the density of the second component is greater than the density of the first component at least by 1 g/cm$^3$. This permits to achieve a noticeable increase of a storable kinetic energy when the ratio of the first component to the second component by their constructional volume amounts to 2:1, and optimally at least to 1:1.

It is advantageous for storing the kinetic energy when the firs component is formed of steel having a density from about 7 g/cm$^3$ to about 8.4 g/cm$^3$, and the second component is formed of material having a density greater than 8.5 g/cm$^3$.

It is advantageous when the second component is formed of metal selected from the group consisting of lead, copper, zinc, nickel, tin, silver, and mercury. These metals have a high density and industrially are easy to process. Moreover, these metals need not be metallurgically pure.

It is further advantageous when wherein the second component is formed of an alloy formed of at least two metals selected from the group consisting of lead, copper, nickel, tin, zinc, silver, and mercury. A copper-tin alloy and brass are representative of such an alloy.

Instead of metal or alloys, the components can be formed of non-metallic materials having a corresponding high density.

It is advantageous when the first component is formed as a base body carrying the rim and the hub. The base body can be formed as a rotary body, so that an imbalance does not present a problem.

In an easily and favorably manufactured embodiment, the second component is formed as an additional body which is arranged in at least one rotationally symmetrical recess in the base body. It is advantageous when the second component is arranged at a greater possible distance from the rotational axis of the flywheel to obtain a highest possible inertia torque. This is because the increase of the kinetic energy, which is stored in the flywheel, is directly proportional to the additional inertia torque produced by the more heavy second component.

In another easily and favorably manufactured embodiment the second component is formed as an annular body that is supported, together with the base body on a common axle.

The novel features of the present invention, which are considered as characteristic for the invention, are set forth in the appended claims. The invention itself, however, both as to its construction and its mode of operation, together with additional advantages and objects thereof, will be best understood from the following detailed description of preferred embodiments, when read with reference to the accompanying drawings.

DETAILED DESCRIPTION OF THE PREFERRED EMBODIMENTS

Figure 1:
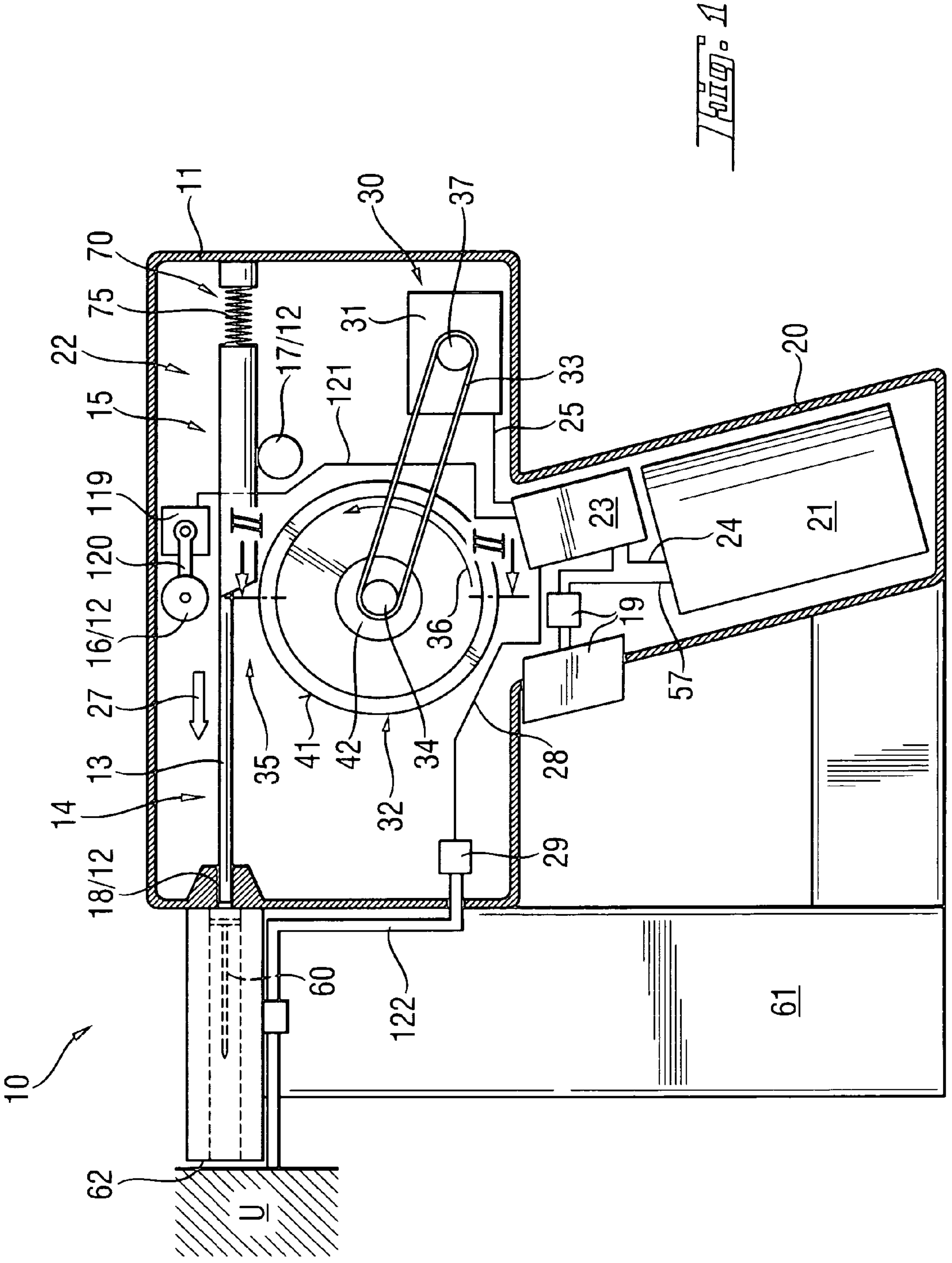
FIG. 1 a longitudinal cross-sectional view of a drive-in tool according to the present invention in an initial position thereof.
Figure 2:
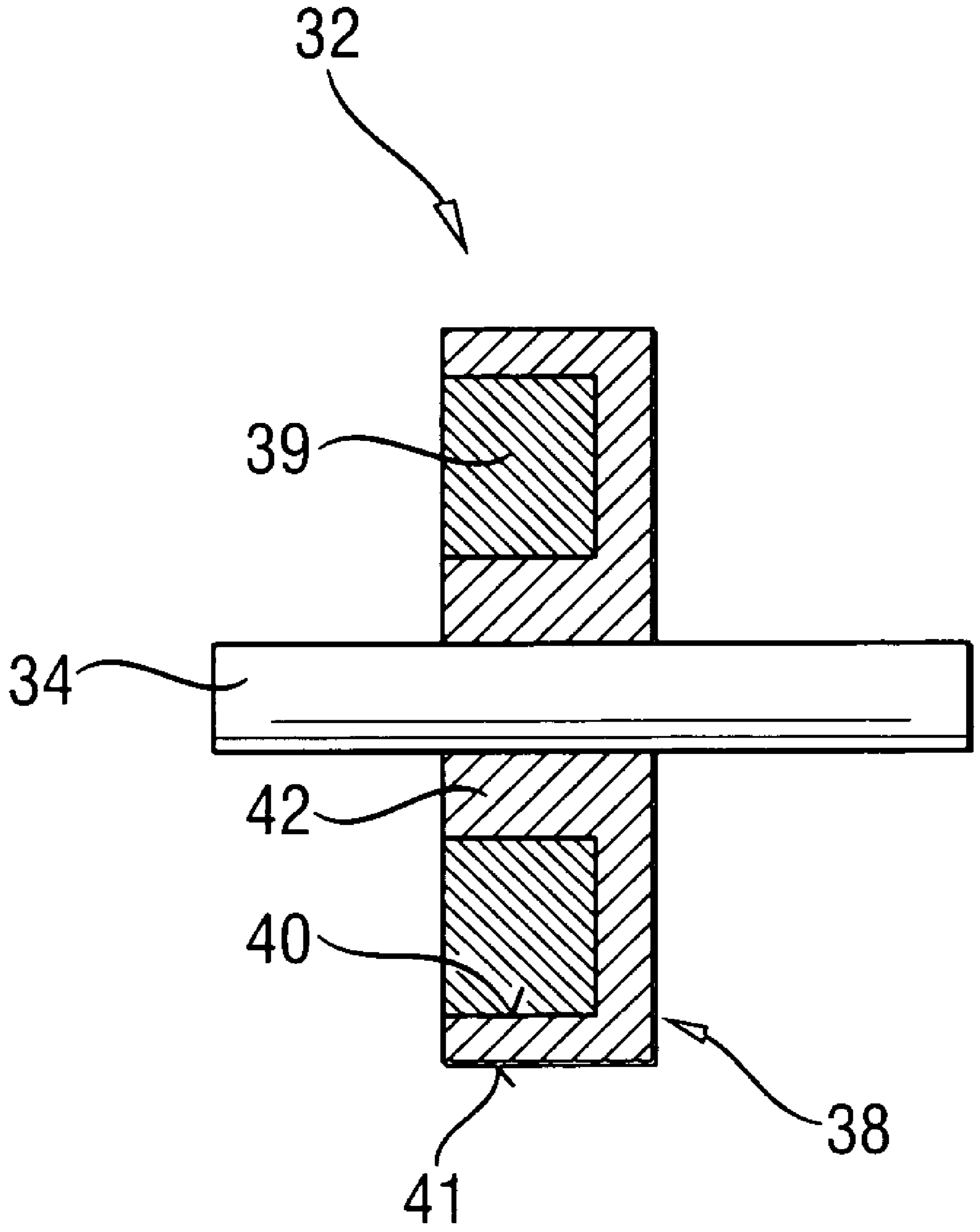
FIG. 2 a partial cross-sectional view along line II-II in FIG. 1.

A drive-in tool 10 according to the present invention, which is shown in FIGS. 1 and 2, includes a housing 11, a driving ram 13 displaceable in a guide 12, and a drive unit for driving the ram 13 and which is generally designated with a reference numeral 30 and is arranged in the housing 11. The guide 12 includes a guide roller 17, pinch means 16 in form of a pinch roller, and a guide channel 18. At an end of the guide 12 facing in a drive-in direction 27, there is provided a magazine 61 with fastening elements 60 which projects sidewise of the guide 12.

The pinch means 16 is pivotally supported on a support arm 120 displaceable in a direction toward the driving ram 13 and away therefrom by adjusting means 119. A control conductor 121 connects the adjusting means 119 with a control unit 23.

The drive-in tool 10 further includes a handle 20 on which an actuation switch 19 for initiating a drive-in process with the drive-in tool 10 is arranged. In the handle 20, there is arranged a power source designated generally with a reference numeral 21 and which supplies the drive-in tool 10 with electrical energy. The power source 21 includes, in the embodiment shown in the drawings, at least one accumulator. An electrical conductor 24 connects the power source 21 with the control unit 23. A switch conductor 57 connects the control unit 23 with the actuation switch 19.

At an opening 62 of the drive-in tool 10, a feeler 122 is arranged. The feeler 122 actuates switch means 29 which is connected by a conductor 28 with the control unit 23. The switch means 29 sends an electrical signal to the control unit 23 as soon as the drive-in tool 10 engages a constructional component U, as shown in FIG. 1 and insures, thus, that the drive-in tool 10 only then actuated when the drive-in tool 10 is properly pressed against the constructional component U.

The drive unit 30 includes an electric motor 31 with a shaft 37. Belt transmission means 33 transmits the rotational movement of the shaft 37 of the motor 31 to a support axle 34 of a drive flywheel 32, rotating the drive flywheel 32 in a direction of arrow 36. The control unit 23 supplies the electrical power to and actuates the motor 31 via a motor conduit 25. The motor 31 can, e.g., already be actuated by the control unit 23 when the drive-in tool 10 is pressed against the constructional component U, and a corresponding signal is communicated by the switch means 29 to the control unit 23. A drive coupling 35, which is formed as a friction coupling, is arranged between the drive flywheel 32 and the driving ram 13. The drive coupling 35 includes a coupling section 15 of the driving ram 13 and which is wider than the driving section 14 of the driving ram 13. Upon movement of the driving ram 13 from its initial position 22 in the drive-in direction 27 and lowering of the pinch means 16 by the adjusting means 119, the coupling section 15 is brought into the clearance separating the lowered pinch means 16 and the drive flywheel 32, frictionally engaging both the pinch means 16 and the drive flywheel 32.

The drive-in tool 10 further includes a return device generally designated with a reference numeral 70.

The return device 70 includes a spring 75 formed as a tension spring. The spring 75 displaces the driving ram 13 in its initial position 22 when the driving ram 13 occupies its end, in the drive-in direction 27, position.

As shown in FIG. 2, the drive flywheel 32 is formed of two components. The first component is formed as a base body 38 and is formed of steel. The base body 38 has a hub 42 and an annular outer rim 41. The steel has a density of from about 7 g/cm$^3$ to about 8.4 g/cm$^3$. The drive flywheel 32 further includes second component in form of an annular body 39 that is arranged in a recess 40 formed between the rim 41 and the hub 42. The annular body 39 is formed of a material the density of which is greater than that of the material of the base body 38. In the embodiment shown in FIG. 2, the annular body 39 is formed of lead which, dependent on its purity, has a density in a range from about 11 g/cm$^3$ to about 11.4 g/cm$^3$. Instead of lead, similar material having a high density can be used.

Figure 3:
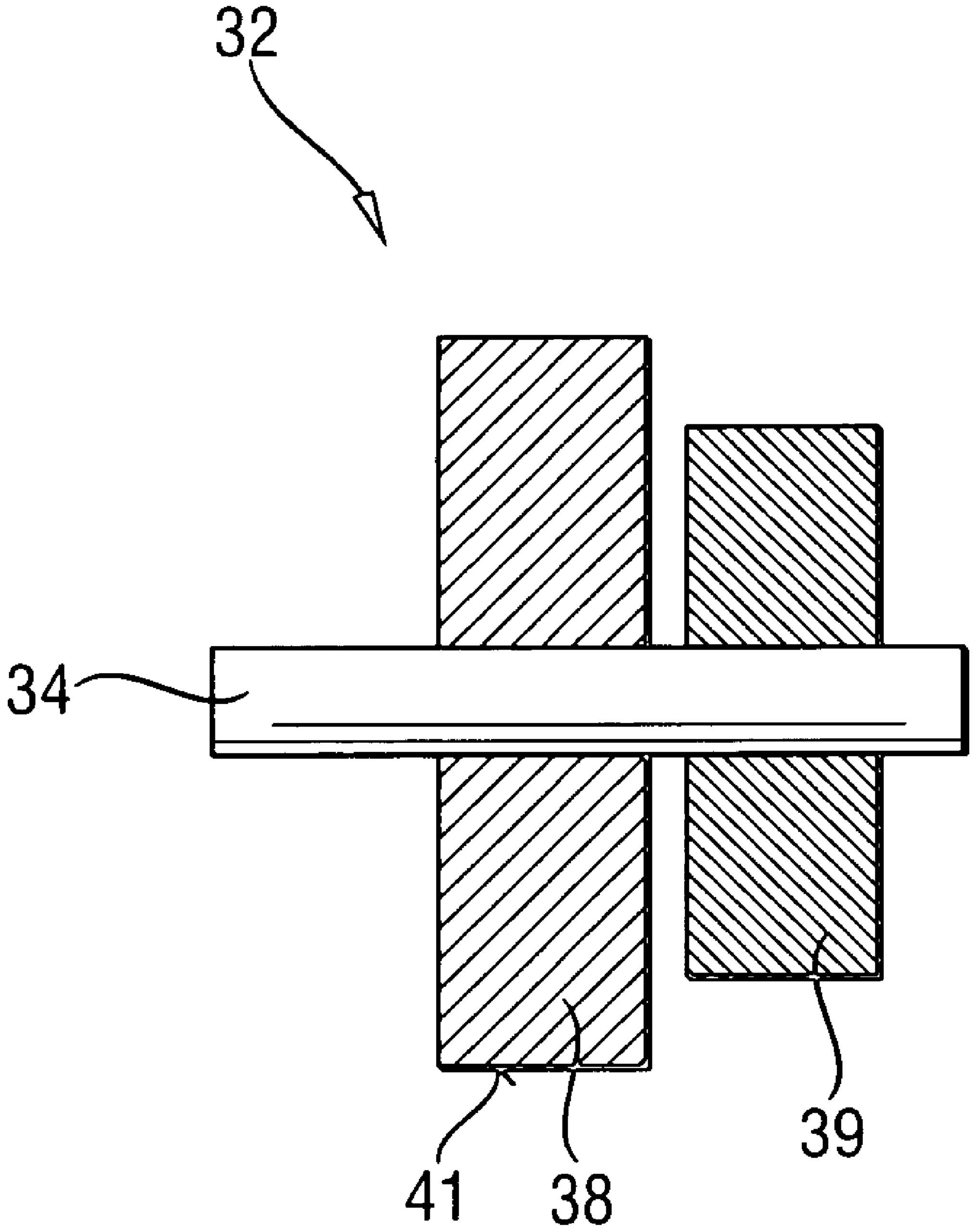
FIG. 3 a partial cross-sectional view similar to that of FIG. 2 of another embodiment of a drive flywheel.

The drive flywheel 32 shown in FIG. 3 differs from that shown in FIG. 2 in that the annular body 39 is arranged coaxially with the base body 38 on a support axle 34 and is not formed as an insert receivable in the base body 38.

The drive flywheel 32 according to the present invention can store a large amount of kinetic energy in comparison with conventional flywheels having the same dimensions, without a need to increase the rotational speed.

Though the present invention was shown and described with references to the preferred embodiments, such are merely illustrative of the present invention and are not to be construed as a limitation thereof and various modifications of the present invention will be apparent to those skilled in the art. It is, therefore, not intended that the present invention be limited to the disclosed embodiments or details thereof, and the present invention includes all variations and/or alternative embodiments within the spirit and scope of the present invention as defined by the appended claims.

What is claimed is:

1. An electrical drive-in tool for driving in fastening elements, comprising:
- a guide (12);
- a driving ram (13) displaceable in the guide (12); and
- a drive unit (30) including:
  - a drive flywheel (32) having:
    - a hub;
    - a first component forming at least a circumferentially arranged rim and formed of steel having a density from about 7 g/cm$^3$ to about 8.4 g/cm$^3$;
    - a second component forming an annular body positioned between the circumferentially arranged rim and the hub of the drive flywheel (32), with the second component being formed of a material having a density greater than 8.5 g/cm$^3$ and also greater than at least 1 g/cm$^3$ of the density of the steel of which the first component is formed;
  - a motor (31) for rotating the drive flywheel (32); and wherein the second component is formed of metal selected from the group consisting of lead, copper, nickel, tin and silver.

2. A drive-in tool according to claim 1, wherein the second component is formed of an alloy formed of at least two metals selected from the group consisting of lead, cooper, nickel, tin, zinc, silver, and mercury.

3. A drive-in tool according to claim 1, wherein the first component forms a base body (38) carrying the rim (41) and the hub (42).

4. A drive-in tool according to claim 3, wherein the annular body of the second component is formed as an annular body (39) that is arranged in at least one rotationally symmetrical recess (40) formed in the base body (38).

5. A drive-in tool according to claim 3, wherein the annular body of the second component is formed as an annular body (39) that is supported, together with the base body (38) on a common axle (34).

6. A drive flywheel for driving a driving ram of a drive-in tool, comprising:
- a hub;
- a first component forming at least a circumferentially arranged rim and formed of steel having a density from about 7 g/cm$^3$ to about 8.4 g/cm$^3$;

a second component forming an annular body positioned between the circumferentially arranged rim and the hub, with the second component being formed of a material having a density greater than 8.5 $g/cm^3$ and also greater than at least 1 $g/cm^3$ of the density of the steel of which the first component is formed; and wherein the second component is formed of metal selected from the group consisting of lead, copper, nickel, tin and silver.

* * * * *